United States Patent
Logé et al.

(10) Patent No.: US 9,013,178 B2
(45) Date of Patent: Apr. 21, 2015

(54) RESOLVER

(75) Inventors: Hans Logé, Neukeferloh (DE); Andreas Hitzer, Munich (DE)

(73) Assignee: LTN Servotechnik GmbH, Otterfing (DE)

( * ) Notice: Subject to any disclaimer, the term of this patent is extended or adjusted under 35 U.S.C. 154(b) by 307 days.

(21) Appl. No.: 13/318,610

(22) PCT Filed: Jan. 28, 2010

(86) PCT No.: PCT/EP2010/000510
§ 371 (c)(1),
(2), (4) Date: Nov. 2, 2011

(87) PCT Pub. No.: WO2010/127728
PCT Pub. Date: Nov. 11, 2010

(65) Prior Publication Data
US 2012/0062217 A1   Mar. 15, 2012

(30) Foreign Application Priority Data
May 7, 2009   (DE) .......................... 10 2009 020 327

(51) Int. Cl.
   *G01B 7/30*   (2006.01)
   *G01D 5/20*   (2006.01)
   *G01P 3/487*  (2006.01)
   *H01F 38/18*  (2006.01)

(52) U.S. Cl.
   CPC .............. *G01D 5/2073* (2013.01); *G01P 3/487* (2013.01); *H01F 38/18* (2013.01)

(58) Field of Classification Search
   CPC ..................................................... G01R 33/091
   USPC ...................................... 324/160–180, 207.25
   See application file for complete search history.

(56) References Cited

U.S. PATENT DOCUMENTS

| | | | |
|---|---|---|---|
| 2,994,319 A * | 8/1961 | Blume et al. ................ | 126/271.1 |
| 4,002,937 A * | 1/1977 | Anson ............................ | 310/168 |
| 5,705,872 A * | 1/1998 | Loge ............................. | 310/161 |
| 6,930,423 B2 * | 8/2005 | Kitazawa ....................... | 310/168 |
| 7,052,184 B2 * | 5/2006 | Chadwick et al. ............ | 384/537 |
| 7,301,333 B2 * | 11/2007 | Kuwahara ................ | 324/207.25 |
| 2003/0102949 A1 | 6/2003 | Matsuura et al. | |
| 2004/0150395 A1 * | 8/2004 | Miya et al. ............... | 324/207.25 |

(Continued)

FOREIGN PATENT DOCUMENTS

| | | |
|---|---|---|
| CN | 1 825 506 | 8/2006 |
| EP | 0 593 351 | 4/1994 |

(Continued)

OTHER PUBLICATIONS

Chinese Search Report, dated Oct. 29, 2013, issued in corresponding Chinese Patent Application No. 201080017029.0.

(Continued)

*Primary Examiner* — Huy Q Phan
*Assistant Examiner* — Dustin Dickinson
(74) *Attorney, Agent, or Firm* — Kenyon & Kenyon LLP

(57) ABSTRACT

In a resolver for determining the relative angular position between two subassemblies, each subassembly includes a winding, the winding being situated inside a housing made up of two housing shells. The housing shells have tabs which are oriented with an axial directional component and joined in interlocking manner with axial overlap at a mutual offset in the circumferential direction.

12 Claims, 2 Drawing Sheets

(56) References Cited

U.S. PATENT DOCUMENTS

| | | |
|---|---|---|
| 2005/0217107 A1 | 10/2005 | Matsuura et al. |
| 2006/0091757 A1* | 5/2006 | Aoki et al. .................... 310/215 |
| 2009/0252607 A1* | 10/2009 | Hein et al. .................... 415/229 |

FOREIGN PATENT DOCUMENTS

| | | |
|---|---|---|
| EP | 1 302 953 | 4/2003 |
| WO | 2008/012130 | 1/2008 |

OTHER PUBLICATIONS

International Search Report, issued in corresponding International Application No. PCT/EP2010/000510.

International Preliminary Report on Patentability and Written Opinion, issued in corresponding International Application No. PCT/EP2010/000510.

\* cited by examiner

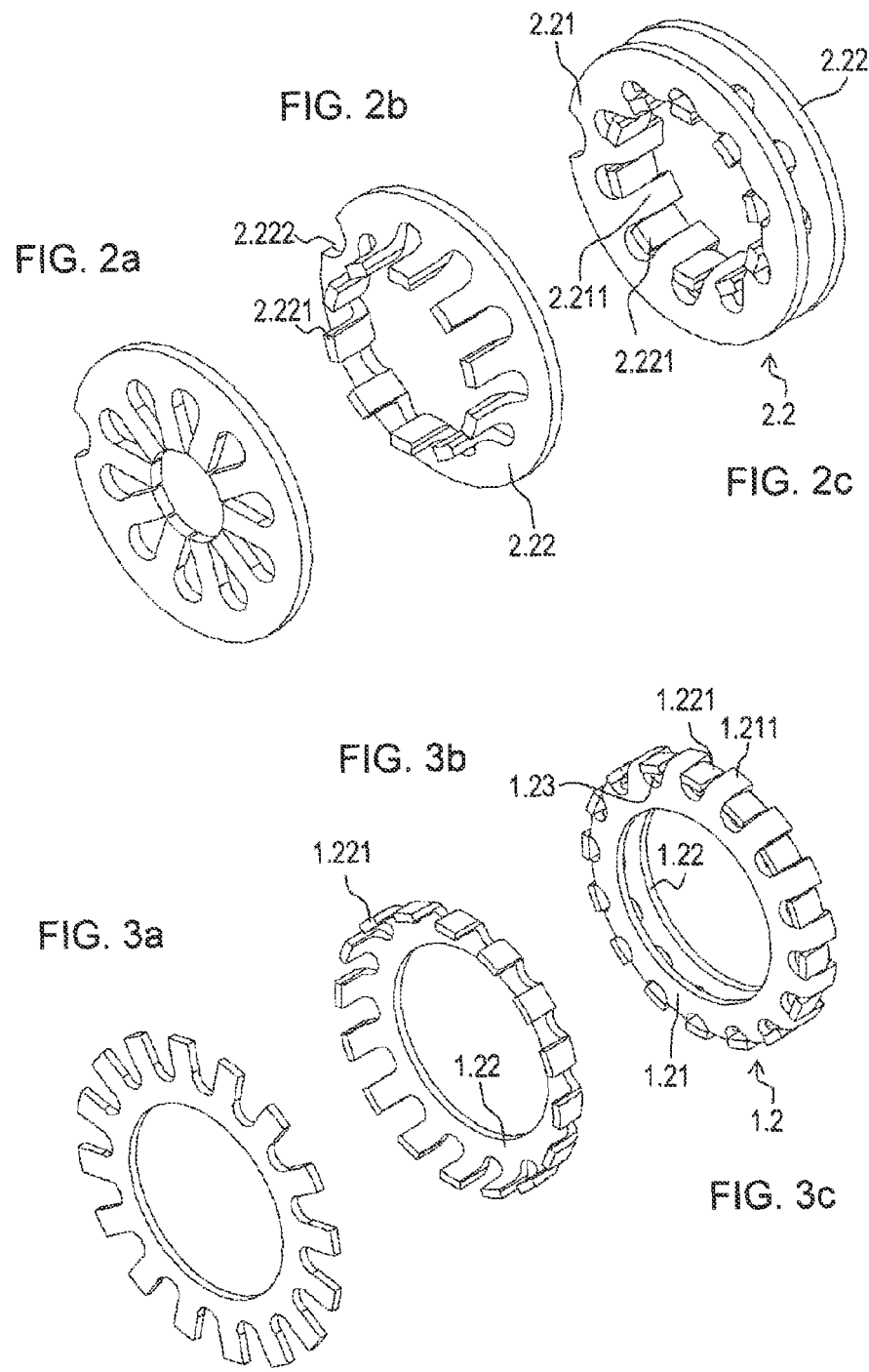

ND C]
RESOLVER

FIELD OF THE INVENTION

The present invention relates to a resolver, especially a brushless resolver.

BACKGROUND INFORMATION

In electrical engineering a resolver is an electromagnetic measuring transformer for converting the angular position of a rotor into an electrical quantity or into electrical signals. These signals are ultimately used for determining the relative angular position between two subassemblies which are able to rotate relative to each other, e.g., two machine parts rotatable relative to each other. In the present application, the term resolver also encompasses measuring converters, which are referred to as synchros or rotary resolvers.

In a resolver, offset stator windings which enclose a rotor situated inside the housing with rotor windings are often disposed inside a housing. In this case both the stator windings and the rotor windings are disposed on a laminated core, which acts as guide for the magnetic flux. The laminated cores are made up of a multitude of individual sheets, which are usually produced from a magnetically soft material in order to increase their electromagnetic effect.

In brushless resolvers, a rotating winding of a transformer transmits the rotor voltage to a stationary winding of the transformer in contactless manner. The windings on the stator side and the rotor side are normally disposed inside a housing of the transformer.

Such resolvers are often produced in large numbers, so that a simple, automated production is called for, if at all possible.

Resolvers are known whose housings for the windings of the transformer are produced by turning processes. This known construction has the disadvantage that the current consumption of the resolver is fairly high due to relatively low efficiency of the transformer, and that the measuring precision is ultimately limited. In addition, turned housing components are quite expensive in the production.

European Published Patent Application No. 1 302 953 describes a brushless resolver, for which a housing for the windings of the transformer is made from a deep-drawn component and a planar component.

Such a construction has disadvantages with regard to the measuring accuracy and, furthermore, can be produced or assembled only at relatively high cost.

SUMMARY

Example embodiments of the present invention provide a resolver which has exceedingly high measuring accuracy and furthermore is able to be produced at minimum expense.

Accordingly, the resolver according to example embodiments of the present invention has two subassemblies which are rotatable about an axis, the resolver being used for determining the relative angular position between the two subassemblies. Each subassembly includes a winding disposed inside a housing which is made up of two housing shells. The housing shells have tabs that are oriented with an axial directional component and joined in interlocking manner with axial overlap at a mutual offset in the circumferential direction.

The arrangement of the resolver makes it possible to increase its measuring accuracy and simultaneously reduce its production expense.

The two housing shells may have an identical geometrical form.

The resolver may be implemented as brushless resolver, and the winding is assigned to a transformer.

The housing shells may be formed in one piece from sheet metal. An iron-silicon alloy may be used as material for the sheet metal. Furthermore, the housing shells may be produced by a stamping process or a bending process.

It is considered advantageous if the resolver has two windings, each being disposed in a housing and each housing having two housing shells. In other words, each of the two windings is situated in one housing. The tabs of one housing are disposed at the outer circumference of the housing, whereas the tabs on the other housing are situated at the inner circumference of the housing. It is also possible for a plurality of windings to be disposed in the one and/or in the other housing.

The resolver may have a resolver housing, and the tabs are configured such that they rest against the resolver housing in elastic manner in the radial direction. As an alternative or in addition, the resolver may have a shaft, and the tabs may alternatively or additionally be configured such that they rest against the shaft in elastic manner in the radial direction. The elastic effect is achievable in that the housing shells are produced by a bending process and the tabs are bent at an angle, so that they rest against the resolver housing or against the shaft in elastic manner in the radial direction. The angle between two adjacent side walls of a housing shell may amount to less than 90°, in particular.

Especially advantageous with regard to the measuring accuracy that is achievable by the resolver and with regard to an economic manufacture is to arrange the housing shells in rotationally symmetrical form with regard to the axis.

Further details and advantages of the resolver according to example embodiments of the present invention are described below with reference to the attached figures.

BRIEF DESCRIPTION OF THE DRAWINGS

FIG. 2a is a perspective view of a sheet metal piece for producing a housing shell.

FIG. 2b is a perspective view of a housing shell.

FIG. 2c is a perspective view of a housing.

FIG. 3a is a perspective view of another sheet metal piece for producing an additional housing shell.

FIG. 3b is a perspective view of the additional housing shell.

FIG. 3c is a perspective view of the additional housing shell.

DETAILED DESCRIPTION

Figure 1:
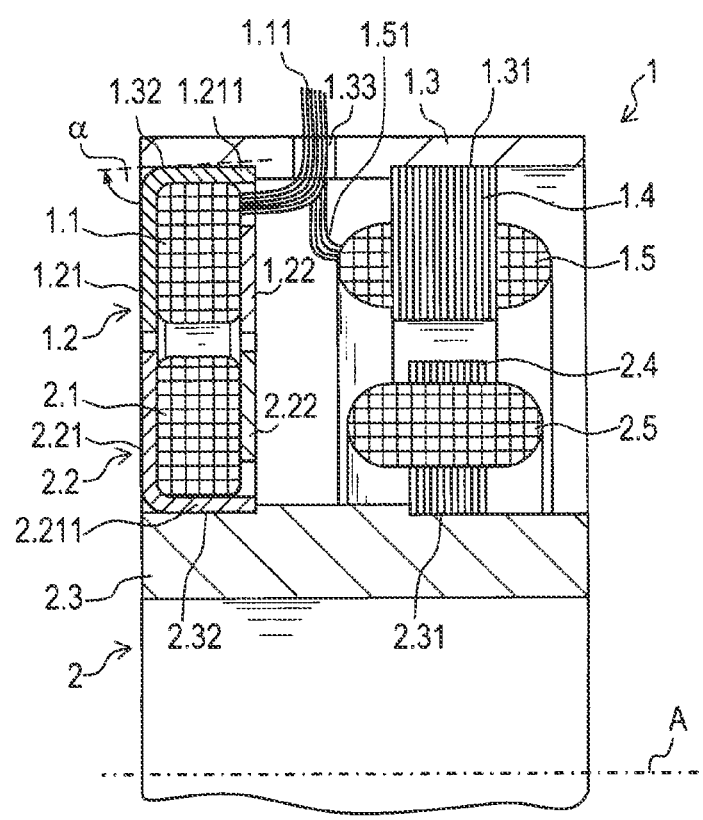
FIG. 1 is a longitudinal sectional view of a resolver.

According to FIG. 1, the resolver includes two subcomponents which are rotatable relative to an axis A, e.g., a stator 1 as first subassembly, and a rotor 2 as second subassembly. Stator 1 has a resolver housing 1.3 which includes a region that acts as mounting support 1.31 for a laminated core 1.4. Receiver windings 1.5 are disposed on this laminated core 1.4. In the illustrated exemplary embodiment, two receiver windings 1.5 which are offset by 90° are provided.

Furthermore, stator 1 has a holding region 1.32 to accommodate a transformer part, which is made up of windings 1.1 and a housing 1.2 surrounding windings 1.1. Housing 1.2 includes two housing shells 1.21, 1.22 provided with tabs 1.211, 1.221, which are oriented with an axial directional component and joined in interlocking manner with axial overlap at a mutual offset in the circumferential direction (see also FIG. 3c). According to FIG. 1, cables 1.11, 1.51, which are used as electrical supply or discharge leads of windings 1.1 or receiver windings 1.5, are routed through a bore 1.33 from the interior of resolver housing 1.3 to the outside. Cables 1.11 of windings 1.1 are routed out of housing 1.2 through one or more grooves 1.23 between tabs 1.221, 1.211 (FIG. 3c), which are created by the special geometry of housing shells 1.21, 1.22.

According to FIG. 1, rotor 2 has a shaft 2.3 on which a holding region 2.32 is produced, which to accommodate a rotor-side transformer part, which includes windings 2.1 and a housing 2.2 surrounding windings 2.1. Rotor-side housing 2.2 also is made up of two housing shells 2.21, 2.22, which likewise include tabs 2.211, 2.221, which are oriented with an axial directional component and joined in interlocking manner with axial overlap at a mutual offset in the circumferential direction (see also FIG. 2c).

The configuration of rotor-side housing 2.2 is shown in FIGS. 2a through 2c. According to FIG. 2a, a substantially annular sheet metal part having corresponding recesses is first separated from a semifinished product with the aid of a stamping process. The semifinished product may be an FeSi sheet metal material, for instance. One of recesses 2.222, which is provided in approximately semicircular form and disposed at the outer circumference of the sheet metal part, is used as cable feedthrough in the assembled resolver.

In the course of the further production processes, tabs 2.221 are subsequently produced by a bending process. In this manner, housing shell 2.22 according to FIG. 2b is produced from a single piece of sheet metal, tabs 2.211, 2.221 of which are disposed at the inner circumference of housing 2.2. The other housing shell 2.21 of rotor-side housing 2.2 has an identical geometrical form as first housing shell 2.22 and is produced accordingly, using the same stamping tools and the same bending tool.

FIG. 2c shows the two housing shells 2.21, 2.22 in order to illustrate the configuration of rotor-side housing 2.2; tabs 2.211, 2.221 which are oriented with an axial directional component and joined in interlocking manner with axial overlap at a mutual offset in the circumferential direction.

The configuration of stator-side housing 1.2 is shown in FIGS. 3a through 3c. Stator-side housing 1.2 has a larger outer diameter than rotor-side housing 2.2 and is made from a single sheet metal piece according to FIG. 3a, with teeth disposed at the outer circumference. The production steps are similar to those of the rotor-side housing 2.2, it being understood that different tools are used than for rotor-side housing 2.2. Housing shells 1.21, 1.22 produced in this manner have tabs 1.211, 1.221, which are situated at the outer circumference of housing 1.2 (FIG. 3b). In addition, the two stator-side housing shells 1.21, 1.22 are arranged in strict rotational symmetry and, in particular, have no explicit recess for a future feedthrough of cables 1.11. As already described earlier, grooves 1.23 produced between housing shells 1.21, 1.22 or between tabs 1.211, 1.221 by joining the two housing shells 1.21, 1.22 according to FIG. 3c are used as feedthrough for cables 1.1.

In the production of the two housings 1.2, 2.2, tabs 1.211, 1.221, 2.211, 2.221 are bent such that they rest against resolver housing 1.3 or against shaft 2.3 in flexible manner in the radial direction. For this purpose tabs 1.211, 1.221; 2.211, 2.221 are bent at an angle α of less than 90°. FIG. 1 shows angle α by the dashed line for stator-side housing shells 1.21 by way of example.

When assembling the transformer parts, housing shells 1.21, 2.21 are thus produced first, as described earlier. One of housing shells 1.21, 2.21 is then fitted with one of windings 1.1, 2.1. Individual housing 1.2, 2.2 is then closed by placing associated second, identical housing shell 1.21, 2.21 on top. Then it is possible, for example, to first insert stator-side housing 1.2 in mounting region 1.32 of resolver housing 1.3, tabs 1.211, 1.221 elastically deforming in radially inward direction. Analogously, rotor-side housing 2.2 is fixed in place in holding region 2.32 of shaft 2.3, tabs 2.211, 2.221 in this case being elastically deformed in radially outward direction. For safety-related reasons, housings 1.2, 2.2 may additionally be secured on resolver housing 1.3 or shaft 2.3, by bonding, for example.

In the exemplary embodiment shown, shaft 2.3 is arranged as a hollow shaft in which an engine shaft, whose angular position is to be determined, is able to be fixed in place in torsionally fixed manner. A laminated core 2.4 provided with transmit windings 2.5 is situated on a mounting support 2.31 of shaft 2.3. Transmit windings 2.5 together with laminated core 2.4 are usually encapsulated in a casting compound once rotor 2 has been assembled. The casting compound is not shown in FIG. 1 for the sake of clarity.

In all other respects, windings 1.1, 2.1 of the transformer and also receiver windings 1.5 and transmit windings 2.5 are made from copper wire in the illustrated exemplary embodiment.

With the aid of a corresponding resolver, the relative angular position between stator 1 and rotor 2 is able to be determined. A sinusoidal alternating current is applied to windings 1.1 of stator 1 for this purpose, with the result that an alternating current having a specified transformation ratio is induced in windings 2.1 of rotor 2. This alternating current is thus applied at transmit windings 2.5 of rotor 2 as well, so that corresponding output voltages are induced in receiver windings 1.5 of stator 1 which enclose transmit windings 2.5 of rotor 2. When using two receiver windings 1.5 of stator 1, offset by 90°, two voltage signals phase-offset by 90° are able to be read, the voltage signals being a function of the relative angular position between stator 1 and rotor 2. The resolver in the case at hand thus is arranged as a brushless resolver or as a resolver without slip ring.

Resolvers having the housings 1.2, 2.2 may achieve relatively high measuring accuracy. For one, this may be due to the fact that the symmetrical design of housings 1.2, 2.2, which furthermore are made up of identical housing shells 1.21, 1.22, 2.21, 2.22, makes it possible to generate very high homogenous stray fields, which has a positive effect on the measuring accuracy. Since completely rotationally symmetrical housing shells 1.21, 1.22 are used in stator-side housing 1.2 as a result of avoiding recesses for cables 1.11, among other things, an exceedingly precise measuring result is obtained in this case.

In this context it is apparent that instead of the individual round geometry of a groove bottom of housing shells 1.21, 1.22, a rectangular arrangement of the groove bottom may be advantageous with regard to stray fields and electromagnetic compatibility with respect to external fields. Thus, in such an arrangement of housing shells 1.21, 1.22, the recesses between tabs 1.211, 1.221 are substantially of rectangular or trapezoidal shape prior to the bending process, each having an open side in a radially outward direction. If applicable, however, the particular (few) grooves 1.23 provided for the feedthrough of cables 1.11 of windings 1.1 in this configuration may continue to be defined by a semicircular geometry of the particular groove bottom.

Furthermore, the centering effect of radially elastic tabs 1.211, 1.221, 2.211, 2.221 also contributes to an increase in the measuring accuracy of the resolver, because radial deviations from the optimal position of the transformer parts lead to measuring inaccuracies.

For construction-related reasons, the measuring accuracy of the new resolver moreover is further increased due to the fact that tabs 1.211, 1.221; 2.211, 2.221 are joined in interlocking manner with an axial overlap at a mutual offset in the circumferential direction. As a result, a relatively large contact area is achievable between housing parts 1.21, 1.22; 2.21, 2.22. This in turn increases the measuring accuracy of the resolver because the magnetic resistance between individual housing parts 1.21, 1.22; 2.21, 2.22 is relatively low for construction-related reasons. On the other hand, no satisfactory electrical contact is established between housing parts 1.21, 1.22; 2.21, 2.22 by the mere joining of stamped tabs 1.211, 1.221; 2.211, 2.221. Contacting tabs 1.211, 1.221; 2.211, 2.221 therefore produce relatively high resistance for eddy currents at the joining lines. In this view it should be taken into account, in particular, that such eddy currents extend tangentially in the sheet metal of housing parts 1.21, 1.22; 2.21, 2.22. This construction has the effect that in particular the manifestation of tangential eddy currents is considerably reduced and the efficiency of the transformer is increased as a result.

With the aid of the measures described herein, a resolver is therefore able to be produced which satisfies highest demands with regard to the measuring accuracy and which simultaneously is able to be produced in exceedingly economical manner.

The invention claimed is:

1. A resolver, comprising:
   two housings, each housing including two housing shells, the housing shells of the respective housings including tabs oriented with an axial directional component and joined in interlocking manner with an axial overlap at a mutual offset in a circumferential direction; and
   two subassemblies rotatable relative to each other about an axis, each subassembly including a winding arranged inside the respective housing;
   wherein the resolver is adapted to determine a relative angular position between the two subassemblies.

2. The resolver according to claim 1, wherein the two housing shells of the respective housings have an identical geometrical form.

3. The resolver according to claim 1, wherein the resolver is arranged as a brushless resolver, and the windings are assigned to a transformer.

4. The resolver according to claim 1, wherein the housing shells are formed in one piece from a sheet metal part.

5. The resolver according to claim 1, wherein the housing shells are stamped and bent parts.

6. The resolver according to claim 1, wherein the tabs on one of the housings are arranged at an outer circumference of the housing, and the tabs on another one of the housings are arranged at an inner circumference of the housing.

7. The resolver according to claim 1, further comprising a resolver housing, and the tabs are configured to rest against the resolver housing in elastic manner in a radial direction.

8. The resolver according to claim 1, further comprising a shaft, the tabs configured to rest against the shaft in elastic manner in a radial direction.

9. The resolver according to claim 7, wherein the housing shells include bent parts, and the tabs are bent at an angle to rest against the resolver housing in elastic manner in the radial direction.

10. The resolver according to claim 8, wherein the housing shells include bent parts, and the tabs are bent at an angle to rest against the shaft in elastic manner in the radial direction.

11. The resolver according to claim 1, wherein the housing shells are arranged in rotational symmetry with respect to the axis.

12. The resolver according to claim 1, wherein the housing shells are formed from a sheet metal part.

* * * * *